United States Patent [19]

Morishita et al.

[11] 4,323,197
[45] Apr. 6, 1982

[54] ROTARY TYPE ELECTROSTATIC SPRAY PAINTING DEVICE

[75] Inventors: Teru Morishita, Shizuoka; Matsuyoshi Sugiyama, Susono; Toshikazu Suzuki, Toyota, all of Japan

[73] Assignee: Toyota Jidosha Kogyo Kabushiki Kaisha, Toyota, Japan

[21] Appl. No.: 168,631

[22] Filed: Jul. 11, 1980

[30] Foreign Application Priority Data

Feb. 18, 1980 [JP] Japan .................................. 55/17892

[51] Int. Cl.³ ........................ B05B 5/04; F16C 27/00; F16C 32/06
[52] U.S. Cl. .................................. 239/703; 239/223; 308/9; 308/15; 308/DIG. 1
[58] Field of Search ............................ 239/700-703, 239/214, 223, 224; 308/9, 15, 121, 122, 168, 170, 174, DIG. 1, DIG. 5

[56] References Cited

U.S. PATENT DOCUMENTS

| | | | |
|---|---|---|---|
| 3,063,642 | 11/1962 | Point | 239/15 |
| 3,083,911 | 4/1963 | Griffiths | 239/15 |
| 3,121,533 | 2/1964 | Sedlacsik, Jr. | 239/15 |
| 3,128,045 | 4/1964 | Gauthier | 239/15 |
| 3,130,066 | 4/1964 | Brady | 117/93.43 |
| 3,155,539 | 11/1964 | Juvinall | 118/11 |
| 3,248,606 | 4/1966 | Fraser | 317/3 |
| 3,281,076 | 10/1966 | Burnside et al. | 239/7 |
| 3,476,447 | 11/1969 | Boyd | 308/9 |
| 3,504,851 | 4/1970 | Demeter | 239/15 |
| 3,512,502 | 5/1970 | Drum | 118/624 |
| 3,873,024 | 3/1975 | Probst | 239/15 |
| 3,985,405 | 10/1976 | Okano et al. | 308/DIG. 1 X |
| 4,148,932 | 4/1979 | Tada et al. | 239/700 X |

FOREIGN PATENT DOCUMENTS

| | | | |
|---|---|---|---|
| 2336181 | 7/1977 | France | 239/703 |
| 1213959 | 11/1970 | United Kingdom | 308/9 |
| 709858 | 1/1980 | U.S.S.R. | 308/9 |

Primary Examiner—Andres Kashnikow
Attorney, Agent, or Firm—Kenyon & Kenyon

[57] ABSTRACT

A rotary type electrostatic spray painting device comprising a rotary shaft and a spray head fixed onto the front end of the rotary shaft. Paint is fed onto the cup shaped inner wall of the spray head. The rotary shaft is supported by a single thrust air bearing and a pair of radial air bearings. An electrode, continuously contacting the rear end of the rotary shaft, is provided. A negative high voltage is applied to the housing of the paint device. In addition, the negative high voltage is also applied to the spray head via the electrode and the rotary shaft. Each of the radial air bearings comprises a plurality of pads cooperating with the rotary shaft, and a bearing support frame supporting the pads via support pins. The bearing support frame is mounted on the outer wall of the housing via O rings. The bearing support frame and the housing are interconnected to each other by a bolt for preventing relative rotation therebetween.

21 Claims, 7 Drawing Figures

ROTARY TYPE ELECTROSTATIC SPRAY PAINTING DEVICE

DESCRIPTION OF THE INVENTION

The present invention relates to a rotary type electrostatic spray painting device.

As an electrostatic spray painting device used for painting, for example, bodies of motor cars, a rotary type electrostatic spray painting device has been known, which comprises a rotary shaft supported by ball bearings or roller bearings within the housing of the painting device, and a cup shaped spray head fixed onto the front end of the roatry shaft. In this painting device, a negative high voltage is applied to the spray head, and paint is fed onto the inner circumferential wall of the spray head. Thus, fine paint particles charged with electrons are sprayed from the spray head and are attracted by the electrical force onto the surface of the body of a motor car, which is grounded. As a result of this, the surface of the body of a motor car is painted. In such a rotary type electrostatic spray painting device, since the paint, the amount of which is about 90 percent relative to the amount of the paint sprayed from the spray head, can be efficiently used for painting the surface to be painted, the consumption of the paint is small and, as a result, a rotary type electrostatic spray painting device is used in the field of various industries.

In order to form a beautiful finished surface when the surface is painted by using a spray paint, it is necessary to reduce the size of the particles of paint as much as possible. In the case wherein the paint is divided into fine particles by using the centrifugal force caused by the rotation of the spray head, as in a rotary type spray painting device, the strength of the centrifugal force, that is, the rotating speed of the spray head has great influence on the size of the particles of paint. In other words, the higher the rotating speed of the spray head becomes, the smaller the size of the particles of paint becomes. Consequently, in order to form a beautiful finished surface by using a rotary type electrostatic spray painting device, it is necessary to increase the rotating speed of the spray head as much as possible. As mentioned above, in a conventional rotary type electrostatic spray painting device, ball bearings or roller bearings are used for supporting the rotary shaft of the electrostatic spray painting device and, in addition, a lubricant, such as grease, is confined within the ball bearings or the roller bearings. However, when such bearings, which are lubricated by grease, are rotated at a high speed, the bearings instantaneously deteriorate. Therefore, in a conventional rotary type electrostatic spray painting device adopting the bearings which are lubricated by grease, the maximum rotating speed of the rotary shaft, that is, the maximum rotating speed of the spray head, is at most 20,000 r.p.m. However, in the case wherein the rotating speed of the spray head is about 20,000 r.p.m., the size of the particles of paint is relatively large and, thus, it is difficult to form a beautiful finished surface by using such a conventional rotary type electrostatic spray painting device. In a field of the manufacturing of motor cars, the painting process for bodies of motor cars comprises a primary spraying step, an undercoating step, and a finish painting step. However, since it is difficult to form a beautiful finished surface by using a conventional rotary type electrostatic spray painting device as mentioned above, such a conventional rotary type electrostatic spray painting device is used for carrying out the undercoating step, but cannot be used for carrying out the finish painting step.

As a method of lubricating bearings, a jet lubricating system has been known, in which, by injecting the lubricating oil of a low viscosity into the region between the inner race and the outer race of the ball or roller bearing, the friction between the ball or roller and such races is greatly reduced and, at the same time, the heat caused by the friction is absorbed by the lubricating oil. In the case wherein the above-mentioned jet lubricating system is applied to a rotary type electrostatic spray painting device, it is possible to increase the rotating speed of the rotary shaft of the electrostatic spray painting device as compared with the case wherein grease lubricating bearings are used. However, since the jet lubricating system requires a complicated lubricating oil feed device having a large size, it is particularly difficult to apply such a jet lubricating system into a rotary type electrostatic spray painting device. In addition, if the lubricating oil is mixed with the paint, the external appearance of the painted surface is damaged. Therefore, if the jet lubricating system is applied to a rotary type electrostatic spray painting device, it is necessary to completely prevent the lubricating oil from leaking into the paint. However, it is practically impossible to completely prevent the lubricating oil from leaking into the paint and, thus, it is inadvisable to apply the jet lubricating system to a rotary type electrostatic spray painting device.

In addition, a painting device capable of reducing the size of the particles of paint to a great extent, an air injection type electrostatic spray painting device has been known, in which the paint is divided into fine particles by the stream of injection air. In this air injection type electrostatic spray painting device, since the size of the particles of sprayed paint can be reduced to a great extent, as mentioned, it is possible to form a beautiful finished surface. Consequently, in a field of the manufacturing of motor cars, the air injection type electrostatic spray painting device is adopted for carrying out the finish painting step for the bodies of motor cars. However, in such an air injection type electrostatic spray painting device, since the sprayed paint impinges upon the surface to be painted together with the stream of the injection air and, then, a large amount of the sprayed paint escapes, together with the stream of the injection air, without adhering onto the surface to be painted, the amount of the paint used to effectively paint the surface to be painted is about 40 percent of the amount of the paint sprayed from the electrostatic spray painting device. Consequently, in the case wherein an air injection type electrostatic spray painting device is adopted, there is a problem in that the consumption of the paint is inevitably increased. In addition, in this case, a problem occurs in that the paint escaping, together with the stream of the junction air, causes air pollution within factories.

In addition, in the case wherein it is necessary to frequently change the color of the paint as in the manufacturing of motor cars, the cleaning operation of the spray head is repeated everytime a color of the paint is changed. Such a cleaning operation is normally carried out by using a cleanser such as a thinner while rotating the spray head at a low speed. As mentioned previously, in the order to reduce the size of the particles of paint, it is necessary to rotate the spray head at a high speed, while it is necessary to rotate the spray head at a low speed when the cleaning operation of the spray head is carried out as mentioned above. However, in the case wherein the spray head is required to rotate within such a wide range of rotating speeds, there is a danger that a self-exciting vibration of the rotary shaft of the spray head will occur. The self-exciting vibration of the rotary shaft shortens the life of the bearings and, therefore, it is necessary to damp such a self-exciting vibration of the rotary shaft.

An object of the present invention is to provide a tilting pad radial air bearing capable of increasing the rotating speed of a rotary shaft to a great extent and damping the self-exciting vibration of a rotary shaft.

Another object of the present invention is to provide a rotary type electrostatic spray painting device capable of reducing the size of the particles of paint to be sprayed and reducing the quantity of paint used.

According to the present invention, there is provided a non-contact type radial air bearing for supporting a rotary shaft arranged in a stationary housing, said bearing comprising: a bearing support frame mounted on an outer wall of said housing via O rings; a plurality of pads, each having an inner face which extends along a circumferential outer wall of said rotary shaft and each being arranged to be spaced from the circumferential outer wall of said rotary shaft by a slight distance; a plurality of support pins, each being connected to said bearing support frame and pivotally supporting said corresponding pad, and; a connecting member interconnecting said bearing support frame to said housing for preventing relative rotation therebetween.

In addition, according to the present invention, there is provided a rotary type electrostatic spray painting device comprising: a metallic housing; a metallic rotary shaft rotatably arranged in said housing and having a front end and a rear end; a cup shaped metallic spray head fixed onto the front end of said rotary shaft and having a cup shaped inner wall; feeding means for feeding a paint onto said cup shaped inner wall; drive means cooperating with said rotary shaft for rotating said rotary shaft; a generator generating a negative high voltage and having an output connected to said housing; electrode means arranged in said housing and electrically connecting said output to said spray head; non-contact type thrust bearing means arranged in said housing and cooperating with said rotary shaft for axially supporting said rotary shaft under a non-contacting state, and; non-contact type radial air bearing means arranged in said housing and cooperating with said rotary shaft for radially supporting said rotary shaft under a non-contacting state, said radial air bearing means comprising a bearing support frame mounted on an outer wall of said housing via O rings, a plurality of pads, each having an inner face which extends along a circumferential outer wall of said rotary shaft and each being arranged to be spaced from the circumferential outer wall of said rotary shaft by a slight distance, a plurality of support pins, each being connected to said bearing support frame and pivotally supporting said corresponding pad, and a connecting member interconnecting said bearing support frame to said housing for preventing relative rotation therebetween.

The present invention may be more fully understood from the description of a preferred embodiment of the invention set forth below, together with the accompanying drawings.

DESCRIPTION OF A PREFERRED EMBODIMENT

Figure 1:
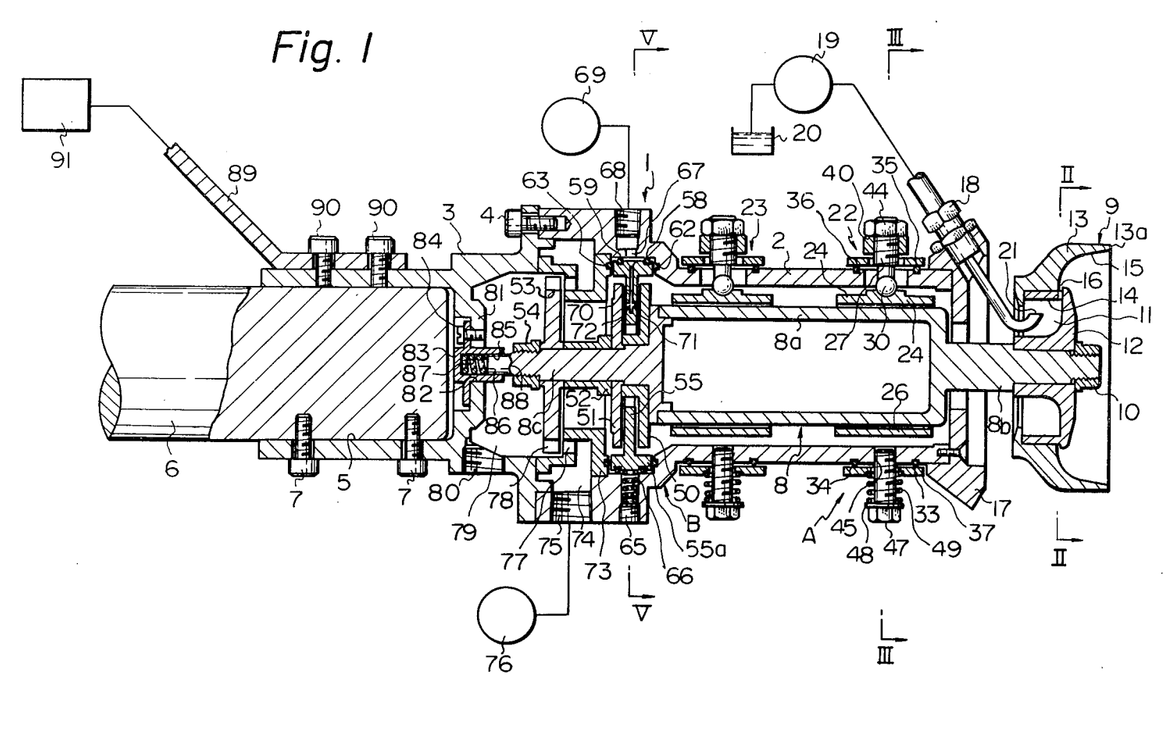
FIG. 1 is a cross-sectional side view of a rotary type electrostatic spray paint device according to the present invention.
Figure 2:
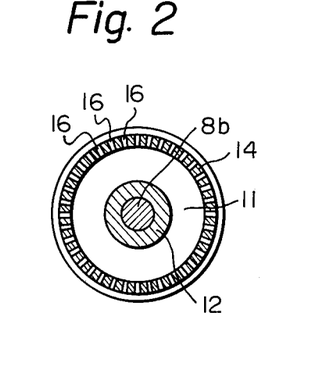
FIG. 2 is a cross-sectional view taken along the line II—II in FIG. 1.

Referring to FIG. 1, a rotary type electrostatic spray painting device, generally designated by reference numeral 1, comprises a generally hollow cylindrical front housing 2 made of metallic material, and a generally hollow cylindrical rear housing 3 made of metallic material. The front housing 2 and the rear housing 3 are firmly joined to each other by bolts 4. A support rod 6, made of electrically insulating material, is fitted into a cylindrical hole 5 formed in the rear housing 3, and this rear housing 3 is fixed onto the support rod 6 by bolts 7. The support rod 6 is supported by a base (not shown). A rotary shaft 8 is inserted into the front housing 2. This rotary shaft 8 comprises a hollow cylindrical portion 8a located in the middle thereof, a shaft portion 8b formed in one piece on the front end of the hollow cylindrical portion 8a, and a shaft portion 8c fixed onto the rear end of the hollow cylindrical portion 8a. A spray head 9 made of metallic material is fixed onto the shaft portion 8b of the rotary shaft 8 by a nut 10. The spray head 9 comprises a spray head supporting member 12 forming therein an annular space 11, and a cup shaped spray head body 13 fixed onto the spray head supporting member 12. As illustrated in FIGS. 1 and 2, a plurality of paint outflow bores 16, each opening into the annular space 11 and smoothly connected to an inner wall 15 of the spray head body 13, is formed in an outer cylindrical portion 14 of the spray head supporting member 12. As illustrated in FIG. 1, an end plate 17 is fixed onto the front end of the front housing 2, and a paint injector 18 is mounted on the end plate 17. The paint injector 18 is connected to a paint reservoir 20 via a paint feed pump 19, and a nozzle 21 of the paint injector 18 is directed to the cylindrical inner wall of the outer cylindrical portion 14 of the spray head supporting member 12.

Figure 3:
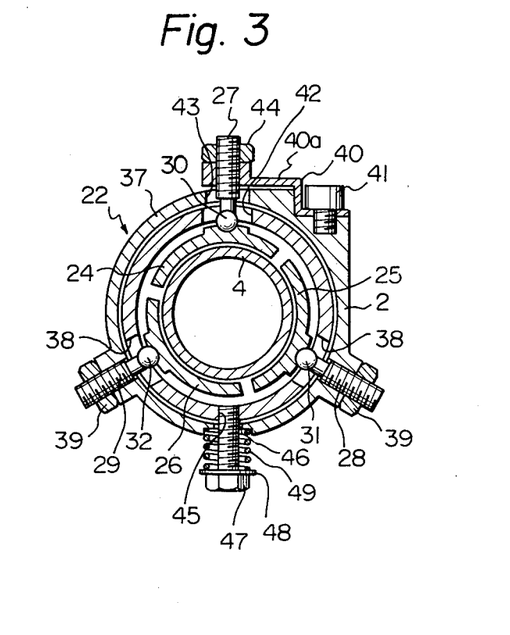
FIG. 3 is a cross-sectional view taken along the line III—III in FIG. 1.
Figure 4:
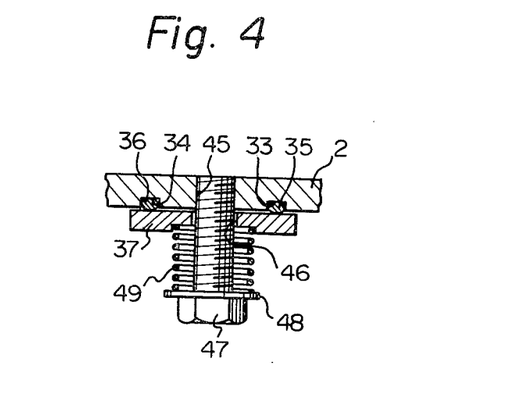
FIG. 4 is an enlarged cross-sectional side view illustrating the portion indicated by the arrow A in FIG. 1.

A pair of non-contact type tilting pad radial air bearings 22 and 23 is arranged in the front housing 2, and the rotary shaft 8 is rotatably supported on the front housing 2 via a pair of the tilting pad radial air bearings 22 and 23. Both the tilting pad radial air bearings 22 and 23 have the same construction and, therefore, the construction of only the tilting pad radial air bearing 22 will be hereinafter described. Referring to FIGS. 1 and 3, the tilting pad radial air bearing 22 comprises three pads 24, 25, 26 arranged to be spaced from the outer circumferential wall of the hollow cylindrical portion 8a of the rotary shaft 8 by an extremely small distance, and three support pins 27, 28, 29 supporting the pads 24, 25, 26 respectively. Spherical tips 30, 31, 32 are formed in one piece on the inner ends of the support pins 27, 28, 29, and are in engagement with spherical recesses formed on the rear faces of the pads 24, 25, 26, respectively. Consequently, the pads 24, 25, 26 can swing about the corresponding spherical tips 30, 31, 32, each functioning as a fulcrum. As illustrated in FIGS. 1 and 4, a pair of ring grooves 33 and 34 is formed on the circumferential outer wall of the front housing 2 at a position located on each side of the support pin 27, and a bearing support frame 37 is mounted on the front housing 2 via a pair of O rings 35 and 36 which are fitted into the ring grooves 33 and 34, respectively. As illustrated in FIG. 3, the support pins 28, 29 pass through openings 38, formed in the front housing 2, and are fixed onto the bearing support frame 37 by means of nuts 39. In addition, one end of a support arm 40, having a resilient plate shaped portion 40a, is fixed onto the bearing support frame 37 by means of a bolt 41. The support pin 27 passes through openings 42 and 43, formed in the front housing 2 and the bearing support frame 37, respectively, and is fixed onto the other end of the support arm 40 by means of a nut 44. Consequently, the pad 24 is urged onto the hollow cylindrical portion 8a of the rotary shaft 8 due to the resilient force of the support arm 40. As illustrated in FIGS. 1, 3 and 4, a threaded hole 45 is formed on the lower end of the front housing 2, and an opening 46, arranged to be aligned with the threaded hole 45, is formed on the bearing support frame 37. The tip of a bolt 47, passing through the opening 46, is screwed into the threaded hole 45. In addition, a washer 48 is fitted into the bolt 47, and a compression spring 49 is inserted between the washer 48 and the bearing support frame 37. The bolt 47 serves to prevent the bearing support frame 37 from rotating and moving in the axial direction relative to the front housing 2 and, in addition, the bolt 47, together with the compression spring 49, serves to electrically connect the bearing support frame 37 to the front housing 2.

Figure 5:
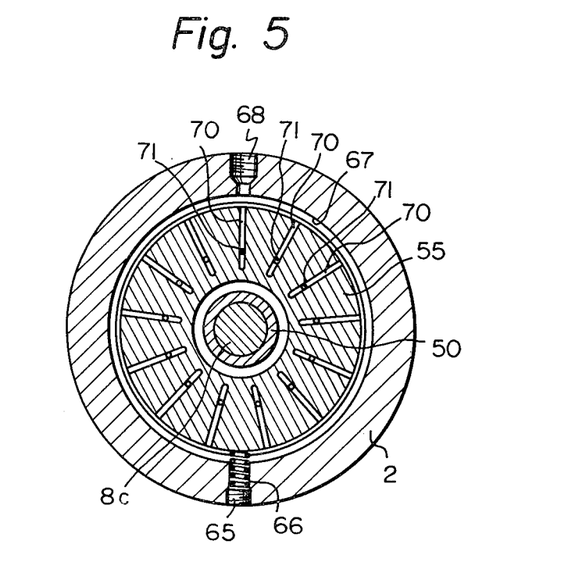
FIG. 5 is a cross-sectional view, taken along the line V—V in FIG. 1.
Figure 6:
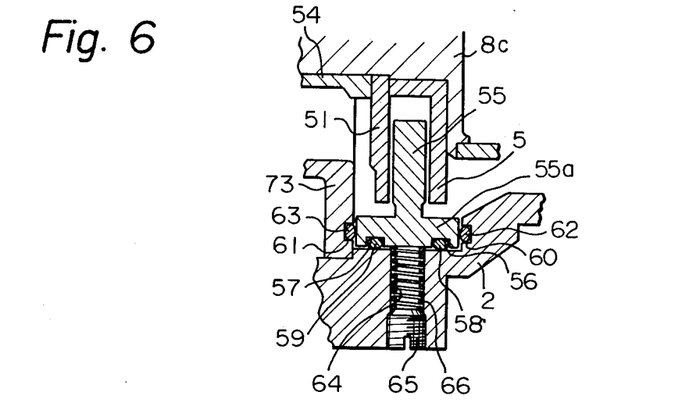
FIG. 6 is an enlarged cross-sectional side view illustrating the portion indicated by the arrow B in FIG. 1.

Turning to FIG. 1, a pair of disc shaped runners 50, 51, is inserted into the shaft portion 8c of the rotary shaft 8 and fixed onto the shaft portion 8c via a spacer 52 and a turbine wheel 53 by means of a nut 54. A stationary annular plate 55 is arranged between the runners 50 and 51, and the runners 50, 51 and the annular plate 55 form a non-contact type thrust air bearing. As illustrated in FIG. 1, each of the runners 50, 51 is arranged to be spaced from the annular plate 55 by a slight distance. As illustrated in FIGS. 1 and 6, a pair of ring grooves 56, 57 is formed on the circumferential outer wall of a circumferentially extending flange 55a of the annular plate 55, and O rings 58 and 59 are fitted into the ring grooves 56 and 57, respectively, so that the annular plate 55 is resiliently supported by the front housing 2 via the O rings 58, 59. In addition, a ring groove 60 is formed on the inner wall of the front housing 2, which faces one of the side wall of the flange 55a of the annular plate 55, and a ring groove 61 is formed on the wall of a nozzle holder 73, which faces the other side wall of the flange 55a. O rings 62 and 63 are fitted into the ring grooves 60 and 61, respectively, so that the annular plate 55 is resiliently supported by the front housing 2 and the nozzle holder 73 via the O rings 62 and 63, respectively. A threaded hole 64, extending outwardly from the circumferential outer wall of the flange 55a, is formed in the front housing 2, and a screw 65 is screwed into the threaded hole 64. A compression spring 66 is inserted into the threaded hole 64 between the annular plate 55 and the screw 65 so that the annular plate 55 is electrically connected to the front housing 2 via the compression spring 66. As illustrated in FIGS. 1 and 5, an annular groove 67, extending along the circumferential outer wall of the flnage 55a of the annular plate 55, is formed in the front housing 2 and connected to an air feed pump 69 via a compressed air supply hole 68 which is formed in the front housing 2. A plurality of air passages 70, each extending radially inwardly from the annular groove 67, is formed in the annular plate 55. In addition, a plurality of air outflow bores 71, each extending towards the runner 50 from the inner end portion of the corresponding air passage 70, is formed in the annular plate 55, and a plurality of air outflow bores 72, each extending towards the runner 51 from the inner end portion of the corresponding air passage 70, is formed in the annular plate 55.

As illustrated in FIG. 1, the turbine nozzle holder 73, supporting the O ring 63, is fixed onto the front housing 2 at a position adjacent to the annular plate 55, and an annular air supply chamber 74 is formed between the turbine nozzle holder 73 and the front housing 2. The air supply chamber 74 is connected to a compressor 76 via a compressed air supply hole 75. The air supply chamber 74 comprises a compressed air injecting nozzle 77 having a plurality of guide vanes (not shown), and turbine blades 78 of the turbine wheel 53 are arranged to face the compressed air injecting nozzle 77. A housing interior chamber 79, in which the turbine wheel 53 is arranged, is connected to the atmosphere via a discharge hole 80 which is formed in the rear housing 3. The compressed air fed into the air supply chamber 74 from the compressor 76 is injected into the housing interior chamber 79 via the compressed air injecting nozzle 77. At this time, the compressed air injected from the injecting nozzle 77 provides the rotational force for the turbine wheel 53 and, thus, the rotary shaft 8 is rotated at a high speed. Then, the compressed air injected from the injecting nozzle 77 is discharged to the atmosphere via the discharge hole 80.

A through-hole 82 is formed on an end wall 81 of the rear housing 3, which defines the housing interior chamber 79, and an electrode holder 83 extending through the through hole 82 is fixed onto the end wall 81 by means of bolts 84. A cylindrical hole 85 is formed coaxially with the rotation axis of the rotary shaft 8 in the electrode holder 83, and a cylindrical electrode 86, made of wear resisting materials such as carbons, is inserted into the cylindrical hole 85 so as to be movable therein. In addition, a compression spring 87 is inserted between the electrode 86 and the electrode holder 83 so that the tip face 88 of the electrode 86 is urged onto the end face of the shaft portion 8c of the rotary shaft 8 due to the spring force of the compression spring 87. An external terminal 89 is fixed onto the outer wall of the rear housing 3 by means of bolts 90 and connected to a high voltage generator 91 used for generating a negative high voltage ranging from −60 kV to −90 kV. Consequently, the negative high voltage is applied to both the front housing 2 and the rear housing 3 and it is also applied to the spray head 9 via the electrode 86 and the rotary shaft 8.

In operation, paint is injected from the nozzle 21 of the paint injector 18 onto the circumferential inner wall of the outer cylindrical portion 14 of the spray head supporting member 12. Then, the paint, injected onto the circumferential inner wall of the outer cylindrical portion 14, flows out onto the inner wall 15 of the spray head body 13 via the paint outflow bores 16 due to the centrifugal force caused by the rotation of the spray head 9. After this, the paint spreads on the inner wall 15 of the spray head body 13 and flows on the inner wall 15 in the form of a thin film. Then, the paint reaches the tip 13a of the spray head body 13. As mentioned previously, the negative high voltage is applied to the spray head 9. Consequently, when the paint is sprayed from the tip 13a of the spray head body 13 is the form of fine particles, the particles of the sprayed paint are charged with electrons. Since the surface to be painted is normally grounded, the paint particles charged with electrons are attracted towards the surface to be painted due to electrical force and, thus, the surface to be painted is painted.

As mentioned previously, the rotary shaft 8 is supported by a pair of the tilting pad radial air bearings 22, 23 and a single thrust air bearing which is constructed by the runners 50, 51 and the stationary annular plate 55. In the tilting pad radial air bearings 22, 23, when the rotary shaft 8 is rotated, ambient air is sucked into the extremely small clearances formed between the hollow cylindrical portion 8a and the pads 24, 25, 26. Then, the air thus sucked is compressed between the hollow cylindrical portion 8a and the pads 24, 25, 26 due to a so-called wedge effect of air and, therefore, the pressure of the air between the hollow cylindrical portion 8a and the pads 24, 25, 26 is increased. As a result of this, the force radially supporting the rotary shaft 8 is generated between the hollow cylindrical portion 8a and the pads 24, 25, 26. On the other hand, in the above-mentioned thrust air bearing, compressed air is fed into the air passages 70 from the air feed pump 69 via the annular groove 67. Then, the compressed air is injected from the air outflow bores 71 into the clearance between the annular plate 55 and the runner 50 and also injected from the air outflow bores 72 into the clearance between the annular plate 55 and the runner 51. As a result of this, the pressure, which is necessary to maintain the above-mentioned clearances formed on each side of the annular plate 55, is generated between the annular plate 55 and the runners 50, 51. Consequently, the rotary shaft 8 is supported by the thrust air bearing and a pair of the radial air bearings under a non-contacting state via a thin air layer. As is known to those skilled in the art, the coefficient of viscosity of air is about one thousandth of that of the viscosity of lubricating oil. Consequently, the frictional loss of the air bearing, which uses air as a lubricant, is extremely small. Therefore, since the amount of heat caused by the occurence of the frictional loss is extremely small, it is possible to increase the rotating speed of the rotary shaft 8 to a great extent. In the embodiment illustrated in FIG. 1, it is possible to rotate the rotary shaft 8 at a high speed of about 80,000 r.p.m.

Figure 7:
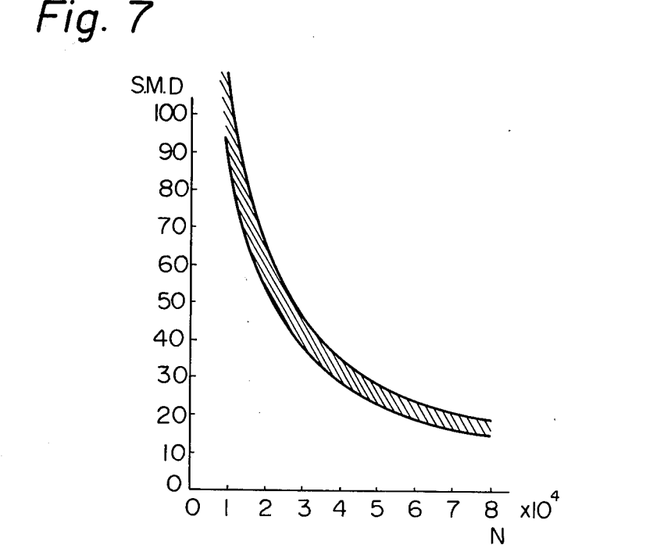
FIG. 7 is a graph showing the relationship between the size of paint particles and the rotating speed of the spray head.

FIG. 7 illustrates the relationship between the size of the particles of sprayed paint and the rotating speed of the spray head in the case wherein the spray head 9 (FIG. 1) having a diameter of 75 mm is used. In FIG. 7, the ordinate S.M.D. indicates the mean diameter ($\mu$m) of paint particles, which is indicated in the form of a Sauter mean diameter, and the abscissa N indicates the number of revolutions per minute (r.p.m.) of the spray head 9. As mentioned previously, in a conventional rotary type electrostatic spray painting device, the maximum number of revolutions per minute N of the spray head is about 20,000 r.p.m. Consequently, from FIG. 7, it will be understood that, if the spray head having a diameter of 75 mm is used in a conventional rotary type electrostatic spray painting device, the minimum mean diameter S.M.D. of paint particles is in the range of 55 $\mu$m to 65 $\mu$m. Contrary to this, in the present invention, the maximum number of revolution per minute N is about 80,000 r.p.m. Consequently, from FIG. 7, it will be understood that the paint can be divided into fine particles to such a degree that the mean diameter S.M.D. of paint particles is in the range of 15 $\mu$m to 20 $\mu$m. Consequently, it will be understood that, in a rotary type electrostatic spray painting device according to the present invention, the size of paint particles can be greatly reduced, as compared with that of paint particles in a conventional rotary type spray painting device.

As mentioned above, the bearing support frame 37, supporting the pads 24, 25, 26, is resiliently supported on the front housing 2 via the O rings 35, 36 and the compression spring 49. Consequently, if self-exciting vibration of the rotary shaft 8 occurs, the vibration energy of the rotary shaft 8 is absorbed by the O rings 35, 36 and the compression spring 49 and, as a result, it is possible to damp the vibration of the rotary shaft 8. In addition, the annular plate 55, constructing a thrust air bearing, is resiliently supported on the front housing 2 via the O rings 58, 59, 62, 63 and the compression spring 66. Consequently, since the vibration energy of the rotary shaft 8 is absorbed by the O rings 58, 59, 62, 63 and the compression spring 66, it is possible to damp the vibration of the rotary shaft 8. In the present invention, since the vibration of the rotary shaft 8 is damped as mentioned above, it is possible to improve the durability of the radial and thrust bearings.

In addition, as mentioned previously, the negative high voltage is applied to the front and rear housings 2, 3, and also, applied to the pads 24, 25, 26 via the bolt 47, the compression spring 49, the bearing support frame 37 and the support pins 27, 28, 29. Therefore, since the same negative high voltage is applied to the pads 24, 25, 26 and the rotary shaft 8, there is no danger that an electric discharge will occur between the pads 24, 25, 26 and the rotary shaft 8. In addition, the negative high voltage is applied to the annular plate 55 via the compression spring 66. Consequently, there is also no danger that an electric discharge will occur between the annular plate 55 and the runners 50, 51.

According to the present invention, since the vibration of the rotary shaft is damped, it is possible to improve the life of the radial and thrust bearings and ensure a stable rotation of the rotary shaft within a wide range of the rotating speed thereof. In addition, since the spray head can be rotated at a high speed of about 80,000 r.p.m., the size of the particles of sprayed paint can be reduced to a great extent. As a result of this, the size of paint particles becomes smaller than that of paint particles obtained by using a conventional air injection type electrostatic spray painting device. Consequently, in the present invention, it is possible to form an extremely beautiful finished surface and, therefore, a rotary type electrostatic spray painting device can be used for carrying out a finish painting step in the paint process, for example, for bodies of motor cars. In addition, in the present invention, since paint particles are created by rotating the spray head at a high speed, but are not created by air injection, the amount of the paint used to effectively paint the surface to be painted is about 90 percent of the amount of the paint sprayed from a rotary type electrostatic spray painting device. Consequently, since a large part of the sprayed paint is not dispersed within the factory, it is possible to prevent the problem regarding air pollution from arising. In addition, the amount of paint used can be reduced.

While the invention has been described by reference to a specific embodiment chosen for purposes of illustration, it should be apparent that numerous modifications could be made thereto by those skilled in the art without departing from the spirit and scope of the invention.

We claim:

1. A rotary type electrostatic spray painting device comprising:
   a metallic housing;
   a metallic rotary shaft rotatably arranged in said housing and having a front end and a rear end;
   a cup shaped metallic spray head fixed onto the front end of said rotary shaft and having a cup shaped inner wall;
   feeding means for feeding a paint onto said cup shaped inner wall;
   drive means cooperating with said rotary shaft for rotating said rotary shaft;
   a generator generating a negative high voltage and having an output connected to said housing;
   electrode means arranged in said housing and electrically connecting said output to said spray head;
   non-contact type thrust bearing means arranged in said housing and cooperating with said rotary shaft for axially supporting said rotary shaft under a non-contacting stage, and;
   non-contact type radial air bearing means arranged in said housing and cooperating with said rotary shaft for radially supporting said rotary shaft under a non-contacting state, said radial air bearing means comprising a bearing support frame mounted on an outer wall of said housing via O rings, a plurality of pads, each having an inner face which extends along a circumferential outer wall of said rotary shaft and each being arranged to be spaced from the circumferential outer wall of said rotary shaft by a slight distance, a plurality of support pins, each being connected to said bearing support frame and pivotally supporting said corresponding pad, and a connecting member interconnecting said bearing support frame to said housing for preventing the relative rotation therebetween.

2. A rotary type electrostatic spray painting device as claimed in claim 1, wherein said housing forms a threaded hole therein, said bearing support frame forming therein an opening which is arranged to be aligned with said threaded hole, said connecting member comprising a bolt which passes through said opening and is screwed into said threaded hole.

3. A rotary type electrostatic spray painting device as claimed in claim 2, wherein said bolt has an enlarged outer end, a compression spring being inserted between said bearing support frame and the enlarged outer end of said bolt.

4. A rotary type electrostatic spray painting device as claimed in claim 1, wherein said radial air bearing means further comprises a resilient arm through which one of said support pins is connected to said bearing frame for biasing said corresponding pad to the circumferential outer wall of said rotary shaft.

5. A rotary type electrostatic spray painting device as claimed in claim 1, wherein each of said pads has an outer wall forming a spherical recess thereon, each of said pins having a spherical tip which is in engagement with the spherical recess of said corresponding pad.

6. A rotary type electrostatic spray painting device as claimed in claim 1, wherein said non-contact type thrust bearing means comprises a thrust air bearing.

7. A rotary type electrostatic spray painting device as claimed in claim 6, wherein said non-contact type thrust bearing means further comprises an air feed pump for producing compressed air, said thrust air bearing comprising a stationary annular plate mounted on an inner wall of said housing via O rings and having opposed side walls, a pair of runners fixed onto said rotary shaft and arranged on each side of said annular plate, each of said runners being speced from the corresponding side wall of said annular plate, and a connecting member electrically interconnecting said annular plate to said housing, a plurality of air outflow bores connected to said air feed pump being formed on the opposed side walls of said annular plate.

8. A rotary type electrostatic spray painting device as claimed in claim 7, wherein said annular plate comprises a circumferentially extending annular flange having a circumferential outer wall and opposed side walls, said O rings being arranged between said front housing and the circumferential outer wall of said flange and between said front housing and the opposed side walls of said flange.

9. A rotary type electrostatic spray painting device as claimed in claim 7, wherein said housing forms therein a threaded hole extending outwardly from a circumferential outer wall of said annular plate, said connecting member comprising a screw screwed into said threaded hole, and a compression spring arranged in said threaded hole between said screw and the circumferential outer wall of said annular plate.

10. A rotary type electrostatic spray painting device as claimed in claim 7, wherein said annular plate forms therein a plurality of radially extending air passages, each connecting said corresponding air outflow bore to said air feed pump.

11. A rotary type electrostatic spray painting device as claimed in claim 1, wherein said electrode means comprises an electrode which is arranged to continuously contact with the rear end of said rotary shaft.

12. A rotary type electrostatic spray painting device as claimed in claim 11, wherein said electrode is made of carbons.

13. A rotary type electrostatic spray painting device as claimed in claim 11, wherein the rear end of said rotary shaft has a flat end face extending parpendicular to the rotation axis of said rotary shaft, said electrode being arranged coaxially with the rotation axis of said rotary shaft and having a flat end face which is in contact with the flat end face of the rear end of said rotary shaft.

14. A rotary type electrostatic spray painting device as claimed in claim 11, wherein said electrode means further comprises an electrode holder fixed onto said housing and having therein a cylindrical hole, into which said electrode is slidably inserted, and a compression spring arrangement in the cylindrical hole of said electrode holder between said electrode holder and said electrode.

15. A rotary type electrostatic spray painting device as claimed in claim 1, wherein said drive means comprises a compressor, an air injection nozzle arranged in said housing and connected to said compressor, and a turbine wheel fixed onto said rotary shaft and having a turbine blade which is arranged to face said air injection nozzle.

16. A rotary type electrostatic spray painting device as claimed in claim 1, wherein said cup shaped spray head comprises a cylindrical inner wall arranged coaxially with the rotation axis of said rotary shaft and defining therein an annular space, a plurality of paint outflow bores being formed in the cylindrical inner wall of said spray head and smoothly connected to the cup shaped inner wall of said spray head, said feed means having a paint injection nozzle which is arranged in said annular space.

17. A non-contact type radial air bearing for supporting a rotary shaft arranged in a stationary housing, said bearing comprising:
- a bearing support frame mounted on an outer wall of said housing via O rings;
- a plurality of pads, each having an inner face which extends along a circumferential outer wall of said rotary shaft and each being arranged to be spaced from the circumferential outer wall of said rotary shaft by a slight distance;
- a plurality of support pins, each being connected to said bearing support frame and pivotally supporting said corresponding pad, and;
- a connecting member interconnecting said bearing support frame to said housing for preventing relative rotation therebetween.

18. A non-contact type radial air bearing as claimed in claim 17, wherein said housing forms a threaded hole therein, said bearing support frame forming therein an opening which is arranged to be aligned with said threaded hole, said connecting member comprising a bolt which passes through said opening and is increased into said threaded hole.

19. A non-contact type radial air bearing as claimed in claim 18, wherein said bolt has an enlarged outer end, a compression spring being arranged between said bearing support frame and the enlarged outer end of said bolt.

20. A non-contact type radial air bearing as claimed in claim 17, wherein said radial air bearing further comprises a resilient arm through which one of said support pins is connected to said bearing frame for biasing said corresponding pad to the circumferential outer wall of said rotary shaft.

21. A non-contact type radial air bearing as claimed in claim 17, wherein each of said pads has an outer wall forming a spherical recess thereon, each of said support pins having a spherical tip which is in engagement with the spherical recess of said corresponding pad.

* * * * *

UNITED STATES PATENT AND TRADEMARK OFFICE
CERTIFICATE OF CORRECTION

PATENT NO. : 4,323,197
DATED : April 6, 1982
INVENTOR(S) : Teru Morishita, et al.

It is certified that error appears in the above—identified patent and that said Letters Patent is hereby corrected as shown below:

Col. 6, line 7, change "flnage" to --flange--.

Col. 9, line 5, change "pollusion" to --pollution--.

Col. 10, line 17, change "speced" to --spaced--.

Col. 10, line 53, change "parpendicular" to --perpendicular--.

Signed and Sealed this

Third Day of August 1982

[SEAL]

Attest:

Attesting Officer

GERALD J. MOSSINGHOFF
Commissioner of Patents and Trademarks